T. POOLEY
Miter-Machines.

No. 145,751.

Patented Dec. 23, 1873.

WITNESSES.

INVENTOR.

UNITED STATES PATENT OFFICE.

THOMAS POOLEY, OF BLACKBERRY STATION, ILLINOIS, ASSIGNOR OF ONE-HALF HIS RIGHT TO NICHOLAS JOHNSON, OF SAME PLACE.

IMPROVEMENT IN MITER-MACHINES.

Specification forming part of Letters Patent No. 145,751, dated December 23, 1873; application filed September 5, 1873.

*To all whom it may concern:*

Be it known that I, THOMAS POOLEY, of Blackberry Station, in the county of Kane and State of Illinois, have invented a new, useful, and Improved Miter-Machine, of which the following is a full, clear, and exact description, which will enable others skilled in the art to which my invention appertains to make and use the same, reference being had to the accompanying drawing forming a part hereof, and in which—

Figure 1:
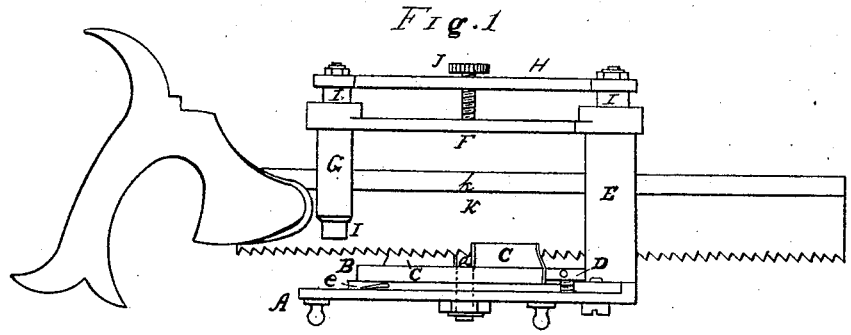
Figure 2:
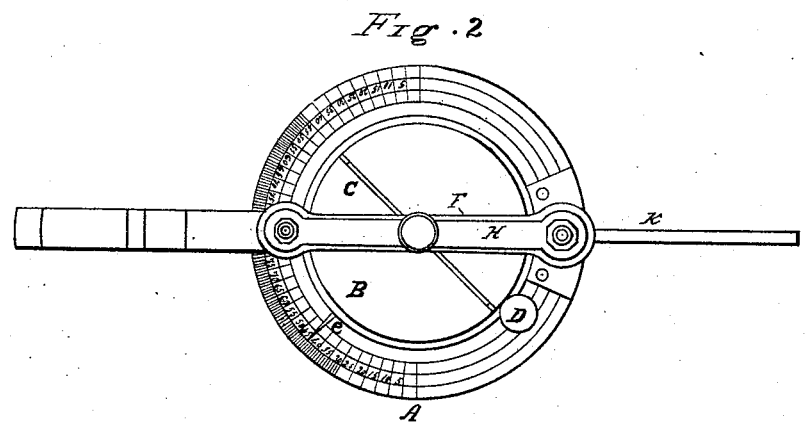
Figure 3:
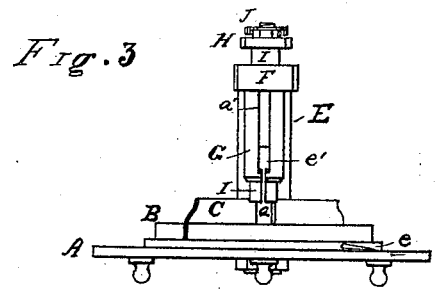

Figure 1 is a side elevation of a machine embodying my invention; Fig. 2, a top or plan view thereof; and Fig. 3, a rear view of the same.

Like letters of reference indicate like parts.

In the drawing, A represents the base of the machine. This base is preferably circular in form and supported on short legs, as shown. The upper face of the base A is provided with a graduated table, spaced and numbered to represent the degrees of a circle, at least ninety (or about ninety) degrees being represented each way from a given point, as shown in Fig. 2. B is a rotary disk or table, centrally pivoted on the upper face of the part A. C is a stop-bar, firmly attached to the table B, and extending across, or partly across, the said table in a line passing through the center of the latter. The central part of the bar C is cut away, as shown at *a*. *e* is a pointer, extending radially from the table B and at right angles to the stop C. D is a thumb-screw lapping the table B and entering the base A. E is a hollow post or standard, firmly attached at one end to the base A at a point in a line passing through the center of the table B, and through the center of the graduated table. This post is slotted vertically in the same line, and F is a horizontal arm, firmly attached to and extending in the same direction from the post E. G is a tubular pendant, firmly attached to the other end of the arm F, and depending vertically therefrom. This pendant is slotted vertically in a plane passing longitudinally through the central part of the arm F, and through the slot of the post E, as shown at *a'* in Fig. 3. H is a horizontal arm, and I I are vertical posts or pendants firmly attached to each end of the arm H, and constructed and arranged to play freely, but not too freely, in the post E and pendant G. J is a thumb-screw, arranged in the arm H and resting on the arm F. K is a saw, provided with a rib extending laterally from its upper edge.

The posts or pendants I I are slotted to receive the saw, as shown at *e'*.

All the parts are arranged together in the manner shown in Figs. 1 and 2.

The saw is supported and retained in its position by means of the slots *e'*, which clasp its rib, and it may be freely drawn back and forth horizontally.

The saw is adjustable vertically by means of the screw J, and may thus be made to either just clear the table B or to sink a greater or less depth into the material operated upon, and which is arranged for that purpose upon the table B and in front of the stop C.

If the central space of the graduated table be numbered 90, and the numbers regularly decreased in numerical importance on each side of the central space, then the material operated upon will be cut in a line at right angles to its sides, when the pointer *e* is arranged adjacent to the central space-line, and this angle may be either increased or diminished on either side of the saw by loosening the screw D, and by turning the table B in a corresponding direction, and the pointer *e* will indicate when the material is arranged at the desired angle with relation to the saw. When the table B is set, it may be retained in its position by tightening the screw D. The lower end of the pendant G, by being arranged above the table B, admits of the material being delivered and removed at the front of the machine.

I am aware that the saw has heretofore been capable, in devices of this class, of being lifted vertically in order to adjust it to the uncut material, and that it has been capable of descending during its operation; but, so far as I am now aware, no means of adjustment has heretofore been provided for the purpose of limiting its downward movement with certainty at any given point. I am also aware that the saw has been adjustable for the purpose of cutting the material at greater or less angles; but

Having thus described my invention, what I claim as new, and desire to secure by Letters Patent, is—

In a mitering-machine for saws, the arm H, provided with the screw J and with the slotted pendants I I, in combination with the slotted post E, arm F, and slotted pendant G, all arranged together substantially as and for the poses specified.

THOMAS POOLEY.

Witnesses:
P. F. WARD,
J. P. WHEELER.